United States Patent
Wang et al.

(10) Patent No.: US 10,389,560 B2
(45) Date of Patent: Aug. 20, 2019

(54) BASEBAND PROCESSING UNIT, RADIO REMOTE UNIT, AND COMMUNICATION METHOD

(71) Applicant: HUAWEI TECHNOLOGIES CO.,LTD., Shenzhen, Guangdong (CN)

(72) Inventors: Yi Wang, Shanghai (CN); Xueliang Chen, Shenzhen (CN); Wen Tong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 176 days.

(21) Appl. No.: 15/215,785

(22) Filed: Jul. 21, 2016

(65) Prior Publication Data

US 2016/0330056 A1    Nov. 10, 2016

Related U.S. Application Data

(63) Continuation of application No. PCT/CN2014/071802, filed on Jan. 29, 2014.

(51) Int. Cl.
   *H04L 27/26* (2006.01)
   *H04W 88/08* (2009.01)
   (Continued)

(52) U.S. Cl.
   CPC .......... *H04L 27/2601* (2013.01); *H04B 1/38* (2013.01); *H04B 7/0617* (2013.01);
   (Continued)

(58) Field of Classification Search
   None
   See application file for complete search history.

(56) References Cited

U.S. PATENT DOCUMENTS 5,890,055 A       3/1999   Chu et al.
2002/0151309 A1  10/2002   Johnson et al.
(Continued)

FOREIGN PATENT DOCUMENTS

CN       1419792 A     5/2003
CN       101005450 A   7/2007
(Continued)

OTHER PUBLICATIONS

Chinese Office Action issued in Chinese Application No. 201480073597.0 dated Oct. 26, 2018, 8 pages.

*Primary Examiner* — Andrew Lai
*Assistant Examiner* — Jamaal Henson
(74) *Attorney, Agent, or Firm* — Fish & Richardson P.C.

(57) ABSTRACT

Embodiments of the present invention provide a baseband processing unit, a radio remote unit, and a communication method. The baseband processing unit includes: a millimeter wave band transceiver, configured to receive an interface signal sent by a radio remote unit by using a millimeter wave band; an interface signal processing module, configured to convert the interface signal received by the millimeter wave band transceiver into uplink baseband data; and a baseband data processing module, configured to: process the uplink baseband data to obtain an uplink baseband signal, and send the uplink baseband signal to a gateway. In the embodiments of the present invention, the baseband processing unit and the radio remote unit may communicate by using the millimeter wave band, thereby saving optical fiber resources.

10 Claims, 7 Drawing Sheets

(51) Int. Cl.
*H04B 1/38* (2015.01)
*H04B 7/06* (2006.01)
*H04L 5/00* (2006.01)
*H04L 5/14* (2006.01)

(52) U.S. Cl.
CPC .............. *H04L 5/0001* (2013.01); *H04L 5/14* (2013.01); *H04W 88/085* (2013.01)

(56) References Cited

U.S. PATENT DOCUMENTS

| | | | | |
|---|---|---|---|---|
| 2008/0181282 | A1* | 7/2008 | Wala | H04B 1/18 375/130 |
| 2009/0258652 | A1* | 10/2009 | Lambert | H04W 88/04 455/446 |
| 2010/0177760 | A1* | 7/2010 | Cannon | H04L 27/0002 370/345 |
| 2011/0182174 | A1 | 7/2011 | Pi et al. | |
| 2011/0243040 | A1 | 10/2011 | Khan et al. | |
| 2012/0093084 | A1 | 4/2012 | Wala et al. | |
| 2013/0003658 | A1* | 1/2013 | Stewart | H04B 7/022 370/328 |
| 2013/0094549 | A1 | 4/2013 | Ridel et al. | |
| 2013/0142136 | A1* | 6/2013 | Pi | H04W 28/0289 370/329 |
| 2013/0343303 | A1 | 12/2013 | Kim et al. | |
| 2014/0140225 | A1* | 5/2014 | Wala | H04W 24/06 370/252 |
| 2014/0321282 | A1* | 10/2014 | Pragada | H04W 36/0072 370/235 |
| 2018/0302117 | A1 | 10/2018 | Wala et al. | |

FOREIGN PATENT DOCUMENTS

| | | |
|---|---|---|
| CN | 101035323 A | 9/2007 |
| CN | 101150348 A | 3/2008 |
| CN | 101350662 A | 1/2009 |
| CN | 101394603 A | 3/2009 |
| CN | 102036134 A | 4/2011 |
| CN | 102970260 A | 3/2013 |
| CN | 103051575 A | 4/2013 |
| CN | 103152843 A | 6/2013 |
| CN | 103199975 A | 7/2013 |

* cited by examiner

BASEBAND PROCESSING UNIT, RADIO REMOTE UNIT, AND COMMUNICATION METHOD

CROSS-REFERENCE TO RELATED APPLICATIONS

This application is a continuation of International Application No. PCT/CN2014/071802, filed on Jan. 29, 2014, which is hereby incorporated by reference in its entirety.

TECHNICAL FIELD

Embodiments of the present invention relate to communications technologies, and in particular, to a baseband processing unit, a radio remote unit, and a communication method.

BACKGROUND

When a radio access network (radio access network, RAN for short) is implemented based on centralized processing (Centralized Processing), collaborative radio (Collaborative Radio), and a real-time cloud infrastructure (Real-time Cloud Infrastructure), an obtained green radio access network infrastructure is referred to as a C-RAN.

In the prior art, a C-RAN architecture mainly includes three parts: a distributed wireless network including a radio remote unit (Radio Remote Unit, RRU for short) and an antenna; a baseband processing unit (Building Base band Unit, BBU for short); and an optical fiber that connects the radio remote unit and the baseband processing unit. With the C-RAN architecture, an operator may quickly deploy or upgrade a network. The operator only needs to deploy some new radio remote units and connect the new radio remote units to the baseband processing unit by using the optical fiber, which may easily expand network coverage or increase a network capacity. If network load increases, the operator only needs to add a processor in the baseband processing unit.

However, in the C-RAN architecture, because the radio remote unit and the baseband processing unit are separated, in a process of connecting the two, a large quantity of fiber links need to be deployed. Therefore, in a place with insufficient optical fiber resources, it is extremely difficult to implement the C-RAN architecture.

SUMMARY

Embodiments of the present invention provide a baseband processing unit, a radio remote unit, and a communication method, which are used to implement a C-RAN architecture in a place with insufficient optical fiber resources.

According to a first aspect, an embodiment of the present invention provides a baseband processing unit, including:

a millimeter wave band transceiver, configured to receive an interface signal sent by a radio remote unit by using a millimeter wave band;

an interface signal processing module, configured to convert the interface signal received by the millimeter wave band transceiver into uplink baseband data; and a baseband data processing module, configured to: process the uplink baseband data to obtain an uplink baseband signal, and send the uplink baseband signal to a gateway.

With reference to the first aspect, in a first possible implementation manner of the first aspect, the millimeter wave band transceiver is further configured to:

receive channel information sent by the radio remote unit by using the millimeter wave band; and perform beamforming on the interface signal according to the channel information to obtain an interface signal on which beamforming has been performed; and the interface signal processing module is specifically configured to convert the interface signal on which beamforming has been performed into uplink baseband data.

With reference to the first aspect or the first possible implementation manner of the first aspect, in a second possible implementation manner of the first aspect, the baseband data processing module is further configured to:

process the uplink baseband data to obtain an uplink baseband signal, and send the uplink baseband signal to another baseband processing unit, so that the another baseband processing unit sends the uplink baseband signal to the gateway.

With reference to the first aspect or either the first or the second possible implementation manner of the first aspect, in a third possible implementation manner of the first aspect, when the millimeter wave band transceiver receives the interface signal sent by the radio remote unit by using the millimeter wave band, at least one of the following duplex modes is used:

time division duplex; or frequency division duplex; or code division duplex; or full duplex.

With reference to the first aspect or any one of the first to third possible implementation manners of the first aspect, in a fourth possible implementation manner of the first aspect, when the millimeter wave band transceiver receives a signal sent by the radio remote unit by using the millimeter wave band, at least one of the following multiple access modes is used:

code division multiple access; or space division multiple access; or frequency division multiple access; or orthogonal frequency division multiple access; or single carrier frequency division multiple access.

According to a second aspect, an embodiment of the present invention provides a baseband processing unit, including:

a baseband data processing module, configured to: receive a downlink baseband signal from a gateway, process the downlink baseband signal to obtain downlink baseband data, and send the downlink baseband data to an interface signal processing module;

the interface signal processing module, configured to convert the downlink baseband data received from the baseband data processing module into an interface signal; and a millimeter wave band transceiver, configured to send the interface signal to a radio remote unit by using a millimeter wave band.

With reference to the second aspect, in a first possible implementation manner of the second aspect, the millimeter wave band transceiver is further configured to:

send channel information to the radio remote unit by using the millimeter wave band, where the channel information is used by the radio remote unit to perform beamforming on the interface signal.

With reference to the second aspect or the first possible implementation manner of the second aspect, in a second possible implementation manner of the second aspect, the baseband data processing module is specifically configured to:

acquire a downlink baseband signal from the gateway by using another baseband processing unit, process the downlink baseband signal to obtain downlink baseband data, and send the downlink baseband data to the interface signal processing module.

With reference to the second aspect or either the first or the second possible implementation manner of the second aspect, in a third possible implementation manner of the second aspect, when the millimeter wave band transceiver sends a signal to the radio remote unit by using the millimeter wave band, at least one of the following duplex modes is used:

time division duplex; or frequency division duplex; or code division duplex; or full duplex.

With reference to the second aspect or any one of the first to third possible implementation manners of the second aspect, in a fourth possible implementation manner of the second aspect, when the millimeter wave band transceiver sends a signal to the radio remote unit by using the millimeter wave band, at least one of the following multiple access modes is used:

code division multiple access; or space division multiple access; or frequency division multiple access; or orthogonal frequency division multiple access; or single carrier frequency division multiple access.

According to a third aspect, an embodiment of the present invention provides a radio remote unit, including:

a radio frequency signal transceiver, configured to receive a radio frequency signal sent by user equipment;

a radio frequency signal processing module, configured to convert the radio frequency signal received by the radio frequency signal transceiver into uplink baseband data;

an interface signal processing module, configured to convert the uplink baseband data into an interface signal; and a millimeter wave band transceiver, configured to send the interface signal to a communications device by using a millimeter wave band.

With reference to the third aspect, in a first possible implementation manner of the third aspect, the communications device includes:

a millimeter wave base station; or a radio access point hub; or another radio remote unit; or a baseband processing unit.

With reference to the third aspect or the first possible implementation manner of the third aspect, in a second possible implementation manner of the third aspect, the radio frequency signal transceiver is specifically configured to:

receive, by using the millimeter wave band or a cellular band, the radio frequency signal sent by the user equipment.

According to a fourth aspect, an embodiment of the present invention provides a radio remote unit, including:

a millimeter wave band transceiver, configured to receive, by using a millimeter wave band, an interface signal sent by a communications device;

an interface signal processing module, configured to convert the interface signal into downlink baseband data;

a radio frequency signal processing module, configured to convert the downlink baseband data into a radio frequency signal; and a radio frequency signal transceiver, configured to send the radio frequency signal to user equipment.

With reference to the fourth aspect, in a first possible implementation manner of the fourth aspect, the communications device includes:

a millimeter wave base station; or a radio access point hub; or another radio remote unit; or a baseband processing unit.

With reference to the fourth aspect or the first possible implementation manner of the fourth aspect, in a second possible implementation manner of the fourth aspect, the radio frequency signal transceiver is specifically configured to:

send the radio frequency signal to the user equipment by using the millimeter wave band or a cellular band.

According to a fifth aspect, an embodiment of the present invention provides a communication method, including:

receiving an interface signal sent by a radio remote unit by using a millimeter wave band;

converting the received interface signal into uplink baseband data; and processing the uplink baseband data to obtain an uplink baseband signal, and sending the uplink baseband signal to a gateway.

With reference to the fifth aspect, in a first possible implementation manner of the fifth aspect, the method further includes:

receiving channel information sent by the radio remote unit by using the millimeter wave band;

performing beamforming on the interface signal according to the channel information to obtain an interface signal on which beamforming has been performed; and converting the interface signal on which beamforming has been performed into uplink baseband data.

With reference to the fifth aspect or the first possible implementation manner of the fifth aspect, in a second possible implementation manner of the fifth aspect, the method further includes:

processing the uplink baseband data to obtain an uplink baseband signal, and sending the uplink baseband signal to another baseband processing unit, so that the another baseband processing unit sends the uplink baseband signal to the gateway.

With reference to the fifth aspect or either the first or the second possible implementation manner of the fifth aspect, in a third possible implementation manner of the fifth aspect, when the interface signal sent by the radio remote unit by using the millimeter wave band is received, at least one of the following duplex modes is used:

time division duplex; or frequency division duplex; or code division duplex; or full duplex.

With reference to the fifth aspect or any one of the first to third possible implementation manners of the fifth aspect, in a fourth possible implementation manner of the fifth aspect, when a signal sent by the radio remote unit by using the millimeter wave band is received, at least one of the following multiple access modes is used:

code division multiple access; or space division multiple access; or frequency division multiple access; or orthogonal frequency division multiple access;

or single carrier frequency division multiple access.

According to a sixth aspect, an embodiment of the present invention provides a communication method, including:

receiving a downlink baseband signal from a gateway, and processing the downlink baseband signal to obtain downlink baseband data;

converting the downlink baseband data into an interface signal; and sending the interface signal to a radio remote unit by using a millimeter wave band.

With reference to the sixth aspect, in a first possible implementation manner of the sixth aspect, the method further includes:

sending channel information to the radio remote unit by using the millimeter wave band, where the channel information is used by the radio remote unit to perform beamforming on the interface signal.

With reference to the sixth aspect or the first possible implementation manner of the sixth aspect, in a second possible implementation manner of the sixth aspect, the method further includes:

acquiring a downlink baseband signal from the gateway by using another baseband processing unit, and processing the downlink baseband signal to obtain downlink baseband data.

With reference to the sixth aspect or either the first or the second possible implementation manner of the sixth aspect, in a third possible implementation manner of the sixth aspect, when a signal is sent to the radio remote unit by using the millimeter wave band, at least one of the following duplex modes is used:

time division duplex; or frequency division duplex; or code division duplex; or full duplex.

With reference to the sixth aspect or any one of the first to third possible implementation manners of the sixth aspect, in a fourth possible implementation manner of the sixth aspect, when a signal is sent to the radio remote unit by using the millimeter wave band, at least one of the following multiple access modes is used:

code division multiple access; or space division multiple access; or frequency division multiple access; or orthogonal frequency division multiple access; or single carrier frequency division multiple access.

According to a seventh aspect, an embodiment of the present invention provides a communication method, including:

receiving a radio frequency signal sent by user equipment;

converting the radio frequency signal into uplink baseband data;

converting the uplink baseband data into an interface signal; and sending the interface signal to a communications device by using a millimeter wave band.

With reference to the seventh aspect, in a first possible implementation manner of the seventh aspect, the communications device includes:

a millimeter wave base station; or a radio access point hub; or another radio remote unit; or a baseband processing unit.

With reference to the seventh aspect or the first possible implementation manner of the seventh aspect, in a second possible implementation manner of the seventh aspect, the receiving a radio frequency signal sent by user equipment includes:

receiving, by using the millimeter wave band or a cellular band, the radio frequency signal sent by the user equipment.

According to an eighth aspect, an embodiment of the present invention provides a communication method, including:

receiving, by using a millimeter wave band, an interface signal sent by a communications device;

converting the interface signal into downlink baseband data;

converting the downlink baseband data into a radio frequency signal; and sending the radio frequency signal to user equipment.

With reference to the eighth aspect, in a first possible implementation manner of the eighth aspect, the communications device includes:

a millimeter wave base station; or a radio access point hub; or another radio remote unit; or a baseband processing unit.

With reference to the eighth aspect or the first possible implementation manner of the eighth aspect, in a second possible implementation manner of the eighth aspect, the sending the radio frequency signal to user equipment includes:

sending the radio frequency signal to the user equipment by using the millimeter wave band or a cellular band.

Embodiments of the present invention provide a baseband processing unit, a radio remote unit, and a communication method, where the baseband processing unit includes a millimeter wave band transceiver, an interface signal processing module, and a baseband data processing module. The millimeter wave band transceiver is configured to receive an interface signal sent by a radio remote unit by using a millimeter wave band; the interface signal processing module is configured to convert the interface signal received by the millimeter wave band transceiver into uplink baseband data; and the baseband data processing module is configured to: process the uplink baseband data to obtain an uplink baseband signal, and send the uplink baseband signal to a gateway. It is implemented that the baseband processing unit and the radio remote unit communicate by using a millimeter wave, and there is no need to use optical fiber resources, so that in a place with insufficient optical fiber resources, a C-RAN architecture may also be implemented.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
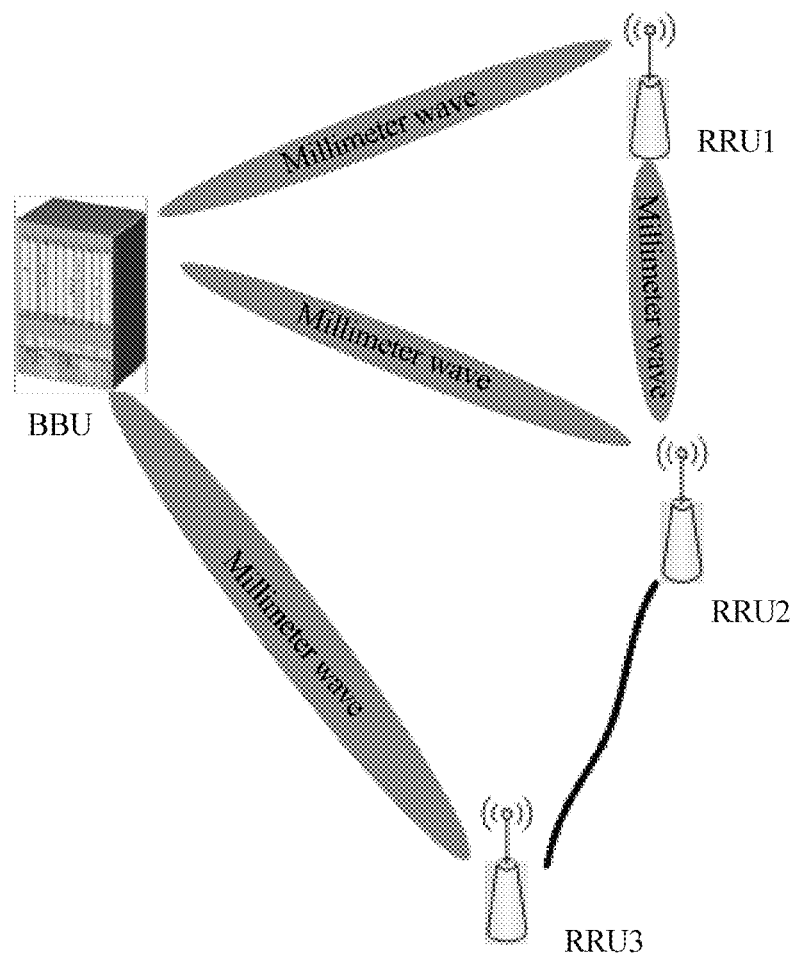
FIG. 1 is a schematic structural diagram of a millimeter wave communications architecture according to a first embodiment the present invention.

FIG. 1 is a schematic structural diagram of a millimeter wave communication architecture according to of a first embodiment the present invention. As shown in FIG. 1, the millimeter wave communications architecture provided in this embodiment includes radio remote units (Radio Remote Unit, RRU for short) and a baseband processing unit (Building Base band Unit, BBU for short).

The radio remote units RRU1 to RRU3 are connected to the baseband processing unit BBU by using millimeter waves (mm wave).

In a specific implementation process, the BBU may be connected to only one radio remote unit RRU1. The BBU is connected to the RRU1 using a millimeter wave. The millimeter wave refers to an electromagnetic wave of which a wavelength is 1 millimeter to 10 millimeters. Compared with a low frequency wave of a cellular band, the millimeter wave is a high frequency wave and has extremely wide bandwidth. It is generally deemed that a frequency range of the millimeter wave is 26.5-300 GHz. Currently, in the communication field, what is relatively commonly used is the low frequency wave of the cellular band, and for the millimeter wave, currently there is still no commercial deployment. In this embodiment, the specific implementation process that a radio remote unit and a baseband processing unit communicate by using a millimeter wave is described from an internal structure of the baseband processing unit and that of the radio remote unit.

Figure 2:
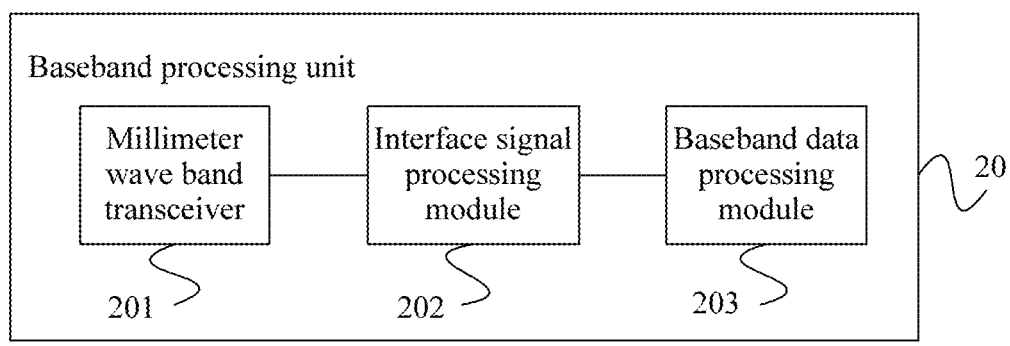
FIG. 2 is a schematic structural diagram of a baseband processing unit according to a first embodiment the present invention.

FIG. 2 is a schematic structural diagram of a baseband processing unit according to of a first embodiment the present invention. As shown in FIG. 2, the baseband processing unit 20 provided in this embodiment of the present invention includes a millimeter wave band transceiver 201, an interface signal processing module 202, and a baseband data processing module 203.

The millimeter wave band transceiver 201 is configured to receive an interface signal sent by a radio remote unit by using a millimeter wave band.

The interface signal processing module 202 is configured to convert the interface signal received by the millimeter wave band transceiver into uplink baseband data.

The baseband data processing module 203 is configured to: process the uplink baseband data to obtain an uplink baseband signal, and send the uplink baseband signal to a gateway.

With reference to FIG. 2, in this embodiment, that a baseband processing unit communicates with a radio remote unit by using a millimeter wave band is described from an uplink aspect first.

In a specific implementation process, when the baseband processing unit communicates with the radio remote unit, the signal needs to comply with a particular interface protocol; therefore, to differentiate the signal from another signal, the signal is referred to as the interface signal in this embodiment. The millimeter wave band transceiver 201 receives the interface signal sent by the radio remote unit by using the millimeter wave band, where the interface signal may be, for example, a common public radio interface (Common Public Radio Interface, CPRI for short) signal. In this embodiment, for a specific implementation manner of the interface signal, details are not described herein.

Optionally, because a millimeter wave is a high frequency microwave and accords with various features of a wave, when the millimeter wave band transceiver 201 receives the interface signal sent by the radio remote unit by using the millimeter wave band, at least one of the following duplex modes is used:

time division duplex; or frequency division duplex; or code division duplex; or full duplex.

Optionally, because a millimeter wave is a high frequency microwave and accords with various features of a wave, when the millimeter wave band transceiver 201 receives a signal sent by the radio remote unit by using the millimeter wave band, at least one of the following multiple access modes is used:

code division multiple access; or space division multiple access; or frequency division multiple access; or orthogonal frequency division multiple access; or single carrier frequency division multiple access.

The interface signal processing module 202 converts the interface signal received by the millimeter wave band transceiver 201 into the uplink baseband data.

The baseband data processing module 203 processes the uplink baseband data to obtain the uplink baseband signal, and sends the uplink baseband signal to the gateway. The uplink baseband signal may be specifically an uplink baseband signal corresponding to a transfer protocol. For example, the transfer protocol is the GPRS Tunneling Protocol (GPRS Turning Protocol, GTP for short).

The baseband data processing module 203 completes a process that the uplink baseband signal is sent to the gateway. In other words, an uplink transfer process is completed.

According to the baseband processing unit provided in this embodiment of the present invention, a millimeter wave band transceiver receives an interface signal sent by a radio remote unit by using a millimeter wave band; an interface signal processing module converts the interface signal received by the millimeter wave band transceiver into uplink baseband data; and a baseband data processing module processes the uplink baseband data to obtain an uplink baseband signal, and sends the uplink baseband signal to a gateway. It is implemented that the baseband processing unit and the radio remote unit communicate by using a millimeter wave, and there is no need to use optical fiber resources, so that in a place with insufficient optical fiber resources, a C-RAN architecture may also be implemented.

Optionally, based on the embodiment in FIG. 2, the millimeter wave band transceiver 201 is further configured to:

receive channel information sent by the radio remote unit by using the millimeter wave band; and perform beamforming on the interface signal according to the channel information to obtain an interface signal on which beamforming has been performed.

The interface signal processing module 202 is specifically configured to convert the interface signal on which beamforming has been performed into uplink baseband data.

In a specific implementation process, to compensate for signal fading and distortion brought by factors such as a space loss and a multipath effect in a wireless propagation process, and to decrease interference between users of a same channel, beamforming may be performed on the interface signal. Specifically, beamforming may be performed on the interface signal according to the channel information to obtain the interface signal on which beamforming has been performed. Then, the interface signal processing module 202 converts the interface signal on which beamforming has been performed into the uplink baseband data.

Optionally, based on the embodiment in FIG. 2, the baseband data processing module 203 is further configured to:

process the uplink baseband data to obtain an uplink baseband signal, and send the uplink baseband signal to another baseband processing unit, so that the another baseband processing unit sends the uplink baseband signal to the gateway.

In a specific implementation process, when the baseband processing unit 20 is located in a C-RAN architecture, the baseband processing unit 20 is any baseband processing unit in a baseband processing pool. After processing the uplink baseband data to obtain the uplink baseband signal, the baseband data processing module 203 may further send the uplink baseband signal to another baseband processing unit in the baseband processing pool, and the another baseband processing unit sends the uplink baseband signal to the gateway.

In this embodiment, an uplink baseband signal is sent to another baseband processing unit, so that the another baseband processing unit sends the uplink baseband signal to a gateway, which implements collaboration between baseband processing units.

Figure 3:
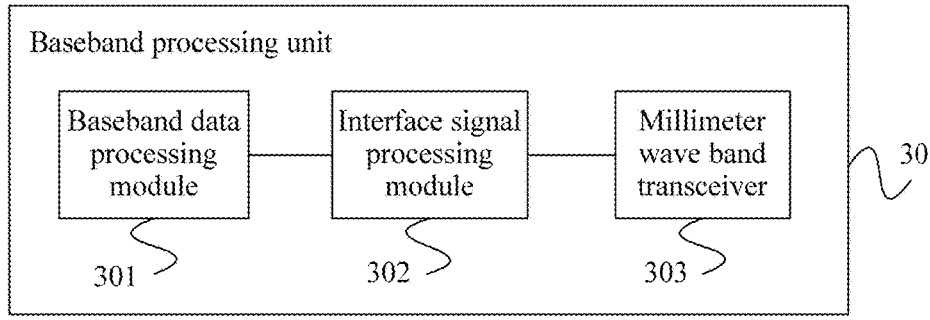
FIG. 3 is a schematic structural diagram of a baseband processing unit according to a second embodiment the present invention.

FIG. 3 is a schematic structural diagram of a baseband processing unit according to of a second embodiment the present invention. As shown in FIG. 3, the baseband processing unit 30 provided in this embodiment of the present invention includes a baseband data processing module 301, an interface signal processing module 302, and a millimeter wave band transceiver 303.

The baseband data processing module 301 is configured to: receive a downlink baseband signal from a gateway, process the downlink baseband signal to obtain downlink baseband data, and send the downlink baseband data to the interface signal processing module.

The interface signal processing module 302 is configured to convert the downlink baseband data received from the baseband data processing module into interface data.

The millimeter wave band transceiver 303 is configured to send the interface data to a radio remote unit by using a millimeter wave band.

With reference to FIG. 3, in this embodiment, that a baseband processing unit communicates with a radio remote unit by using a millimeter wave band is described from a downlink aspect. Persons skilled in the art may understand that, in this embodiment, for ease of description, an internal structure of the baseband processing unit is redivided. In a specific implementation process, the millimeter wave band transceiver 303 in this embodiment and the millimeter wave band transceiver 201 in FIG. 2 may be a same millimeter wave band transceiver; the interface signal processing module 302 in this embodiment and the interface signal processing module 202 in FIG. 2 may be a same interface signal processing module 202; and the baseband data processing module 301 in this embodiment and the baseband data processing module 203 in FIG. 2 may be a same baseband data processing module.

In a specific implementation process, the baseband data processing module 301 receives the downlink baseband signal from the gateway, processes the downlink baseband signal to obtain the downlink baseband data, and sends the downlink baseband data to the interface signal processing module 302. The downlink baseband signal may be a downlink baseband signal corresponding to a transfer protocol. For example, the transfer protocol is the GPRS Tunneling Protocol (GPRS Turning Protocol, GTP for short).

The interface signal processing module 302 converts the downlink baseband data received from the baseband data processing module into the interface signal, where the interface signal may be, for example, a common public radio interface (Common Public Radio Interface, CPRI for short) signal. In this embodiment, for a specific implementation manner of the interface signal, details are not described herein.

The millimeter wave band transceiver 303 sends the interface signal to the radio remote unit by using the millimeter wave band. The radio remote unit sends the interface signal to user equipment or another communications device, thereby completing downlink transmission.

Optionally, because a millimeter wave is a high frequency microwave and accords with various features of a wave, when the millimeter wave band transceiver sends a signal to the radio remote unit by using the millimeter wave band, at least one of the following duplex modes is used:

time division duplex; or frequency division duplex; or code division duplex; or full duplex.

Optionally, because a millimeter wave is a high frequency microwave and accords with various features of a wave, when the millimeter wave band transceiver sends a signal to the radio remote unit by using the millimeter wave band, at least one of the following multiple access modes is used:

code division multiple access; or space division multiple access; or frequency division multiple access; or orthogonal frequency division multiple access; or single carrier frequency division multiple access.

According to the baseband processing unit provided in this embodiment of the present invention, a baseband data processing module 301 receives a downlink baseband signal from a gateway, processes the downlink baseband signal to obtain downlink baseband data, and sends the downlink baseband data to an interface signal processing module; the interface signal processing module converts the downlink baseband data received from the baseband data processing module into interface data; and a millimeter wave band transceiver 303 sends the interface data to a radio remote unit by using a millimeter wave band. It is implemented that a baseband processing unit and the radio remote unit communicate by using a millimeter wave, and there is no need to use optical fiber resources, so that in a place with insufficient optical fiber resources, a C-RAN architecture may also be implemented.

Optionally, based on the embodiment in FIG. 3, the millimeter wave band transceiver 303 is further configured to:

send channel information to the radio remote unit by using the millimeter wave band, where the channel information is used by the radio remote unit to perform beamforming on the interface data.

In a specific implementation process, to compensate for signal fading and distortion brought by factors such as a space loss and a multipath effect in a wireless propagation process, and to decrease interference between users of a same channel, the millimeter wave band transceiver 303 is further configured to send the channel information to the radio remote unit by using the millimeter wave band, where the channel information is used by the radio remote unit to perform beamforming on the interface data.

Optionally, based on the embodiment in FIG. 3, the baseband data processing module 301 is specifically configured to:

acquire a downlink baseband signal from the gateway by using another baseband processing unit, process the downlink baseband signal to obtain downlink baseband data, and send the downlink baseband data to the interface signal processing module.

Specifically, when the baseband processing unit 30 is located in a C-RAN architecture, the baseband processing unit 30 is any baseband processing unit in a baseband processing pool, and another baseband processing unit in the baseband processing pool may acquire the downlink baseband signal from the gateway. Then, the baseband data processing module 301 communicates with the another baseband processing unit to acquire the downlink baseband signal.

In this embodiment, a downlink baseband signal is acquired from a gateway by using another baseband processing unit, the downlink baseband signal is processed to obtain downlink baseband data, and the downlink baseband data is sent to an interface signal processing module, which implements collaboration between baseband processing units.

Figure 4:
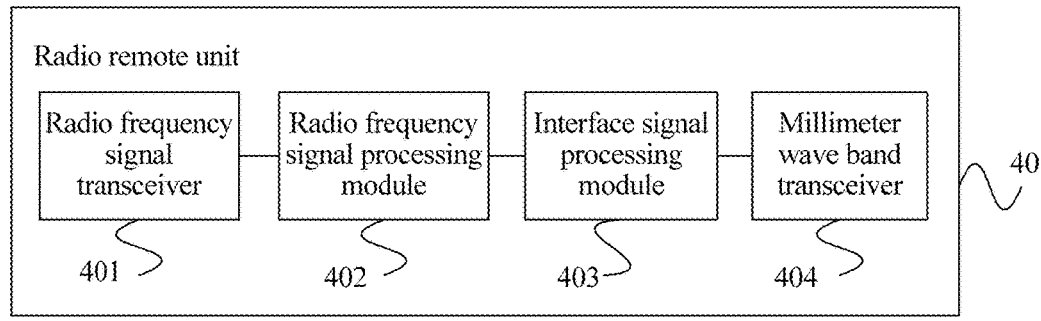
FIG. 4 is a schematic structural diagram of a radio remote unit according to a first embodiment the present invention.

FIG. 4 is a schematic structural diagram of a radio remote unit according to of a first embodiment the present invention. As shown in FIG. 4, the radio remote unit 40 includes a radio frequency signal transceiver 401, a radio frequency signal processing module 402, an interface signal processing module 403, and a millimeter wave band transceiver 404.

The radio frequency signal transceiver 401 is configured to receive a radio frequency signal sent by user equipment.

The radio frequency signal processing module 402 is configured to convert the radio frequency signal received by the radio frequency signal transceiver into uplink baseband data.

The interface signal processing module 403 is configured to convert the uplink baseband data into an interface signal.

The millimeter wave band transceiver 404 is configured to send the interface signal to a communications device by using a millimeter wave band.

In a specific implementation process, in an uplink aspect, the radio frequency signal transceiver 401 receives the radio frequency signal sent by the user equipment. In a receiving process, two possible implementation manners are used. One implementation manner is that the radio frequency signal sent by the user equipment is received by using the millimeter wave band, and the other possible implementation manner is that the radio frequency signal sent by the user equipment is received by using a cellular band.

The radio frequency signal processing module 402 converts the radio frequency signal received by the radio frequency signal transceiver 401 into the uplink baseband data.

The interface signal processing module 403 converts the uplink baseband data into the interface signal, where the interface signal may be, for example, a common public radio interface (Common Public Radio Interface, CPRI for short) signal. In this embodiment, for a specific implementation manner of the interface signal, details are not described herein.

The millimeter wave band transceiver 404 sends the interface signal to the communications device by using the millimeter wave band. Specifically, the communications device includes a millimeter wave base station, or a radio access point hub, or another radio remote unit, or a baseband processing unit.

According to the radio remote unit provided in this embodiment of the present invention, a radio frequency signal transceiver receives a radio frequency signal sent by user equipment; a radio frequency signal processing module converts the radio frequency signal received by the radio frequency signal transceiver into uplink baseband data; an interface signal processing module 403 converts the uplink baseband data into an interface signal; and a millimeter wave band transceiver sends the interface signal to a communications device by using a millimeter wave band. It is implemented that a baseband processing unit and the radio remote unit communicate by using a millimeter wave, and there is no need to use optical fiber resources, so that in a place with insufficient optical fiber resources, a C-RAN architecture may also be implemented.

Figure 5:
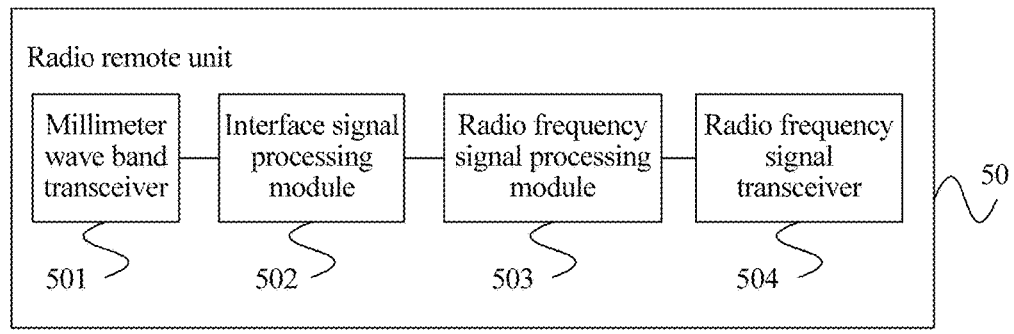
FIG. 5 is a schematic structural diagram of a radio remote unit according to a second embodiment the present invention.

FIG. 5 is a schematic structural diagram of a radio remote unit according to of a second embodiment the present invention. As shown in FIG. 5, the radio remote unit 50 includes:

a millimeter wave band transceiver 501, configured to receive, by using a millimeter wave band, an interface signal sent by a communications device;

an interface signal processing module 502, configured to convert the interface signal into downlink baseband data;

a radio frequency signal processing module 503, configured to convert the downlink baseband data into a radio frequency signal; and a radio frequency signal transceiver 504, configured to send the radio frequency signal to user equipment.

With reference to FIG. 5, in this embodiment, that a radio remote unit communicates with a baseband processing unit by using a millimeter wave band is described from a downlink aspect. Persons skilled in the art may understand that, in this embodiment, for ease of description, an internal structure of the radio remote unit is redivided. In a specific implementation process, the millimeter wave band transceiver 501 in this embodiment and the millimeter wave band transceiver 404 in FIG. 4 may be a same millimeter wave band transceiver; the interface signal processing module 502 in this embodiment and the interface signal processing module 403 in FIG. 4 may be a same interface signal processing module; the radio frequency signal processing module 503 in this embodiment and the radio frequency signal processing module 402 in FIG. 4 may be a same radio frequency signal processing module; and the radio frequency signal transceiver 504 and the radio frequency signal transceiver 401 in FIG. 4 are a same radio frequency signal transceiver.

In a specific implementation process, the millimeter wave band transceiver 501 receives, by using the millimeter wave band, the interface signal sent by the communications device. Specifically, the communications device includes a millimeter wave base station, or a radio access point hub, or another radio remote unit, or a baseband processing unit. The interface signal may be, for example, a common public radio interface (Common Public Radio Interface, CPRI for short) signal. In this embodiment, for a specific implementation manner of the interface signal, details are not described herein.

The interface signal processing module 502 converts the interface signal into the downlink baseband data.

The radio frequency signal processing module 503 converts the downlink baseband data into the radio frequency signal.

The radio frequency signal transceiver 504 sends the radio frequency signal to the user equipment. Specifically, the radio frequency signal transceiver 504 sends the radio frequency signal to the user equipment by using the millimeter wave band or a cellular band.

According to the radio remote unit provided in this embodiment of the present invention, a millimeter wave band transceiver receives, by using a millimeter wave band, an interface signal sent by a communications device; an interface signal processing module converts the interface signal into downlink baseband data; a radio frequency signal processing module converts the downlink baseband data into a radio frequency signal; and a radio frequency signal transceiver sends the radio frequency signal to user equipment. It is implemented that a baseband processing unit and the radio remote unit communicate by using a millimeter wave, and there is no need to use optical fiber resources, so that in a place with insufficient optical fiber resources, a C-RAN architecture may also be implemented.

In the foregoing embodiments, a structure of a baseband processing unit and that of a radio remote unit are described in detail. In a specific implementation process, when the baseband processing unit and the radio remote unit are located in a C-RAN architecture, a new millimeter wave communications architecture may be formed. In the foregoing embodiments, connection relationships between communications devices are described implicitly. The connection relationships between the communications devices in the millimeter wave communications architecture are described in detail.

Figure 6:
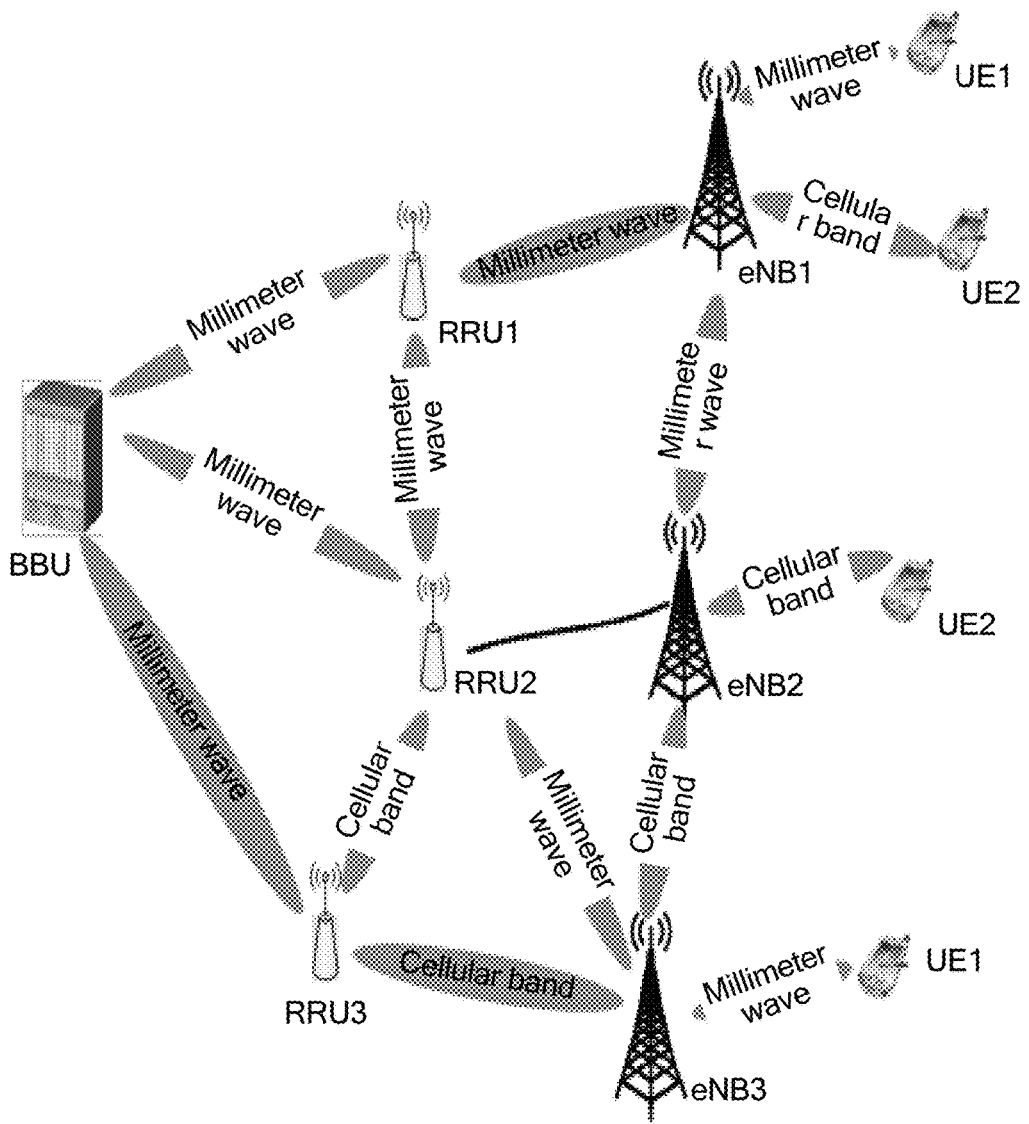
FIG. 6 is a schematic structural diagram of a millimeter wave communications architecture according to a second embodiment the present invention.

FIG. 6 is a schematic structural diagram of a millimeter wave communications architecture according to of a second embodiment the present invention. As shown in FIG. 6, the millimeter wave communications architecture includes three radio remote units, which are respectively an RRU1, an RRU2, and an RRU3, and the RRU1, the RRU2, and RRU3 form a distributed wireless network. The RRU1, the RRU2, and the RRU3 are connected to a BBU by using millimeter waves. In a specific implementation process, a connection between the RRU1 and the RRU2 and a connection between the RRU2 and the RRU3 may include at least one of the following: a millimeter wave connection, a wired connection, or a cellular band connection. FIG. 6 exemplarily shows a possible connection manner. The RRU1 is connected to the RRU2 by using a millimeter wave, and the RRU2 is connected to the RRU3 by using a cellular band. For another connection manner, details are not described herein again in this embodiment.

In this embodiment, because the RRU1, the RRU2, and the RRU3 form the distributed wireless network and a C-RAN network architecture, which may implement effective multi-cell combined resource allocation and a coordinated multipoint transmission technology, thereby improving a throughput of a cell edge user and improving spectral efficiency of a system.

Further, the millimeter wave communications architecture further includes at least one millimeter wave base station. Each millimeter wave base station is a base station in which a baseband processing unit and a radio remote unit are integrated; each millimeter wave base station is connected to first user equipment by using a millimeter wave; and/or each millimeter wave base station is connected to second user equipment by using a cellular band. When there is at least one radio remote unit, the at least one millimeter wave base station and the at least one radio remote unit form a first networking structure, where a connection manner between any millimeter wave base station in the at least one millimeter wave base station and the at least one radio remote unit includes at least one of the following: a millimeter wave connection, a wired connection, or a cellular band connection.

In a specific implementation process, when there is one millimeter wave base station and there is one radio remote unit, a connection between the millimeter wave base station and the radio remote unit may be any one of the following: a millimeter wave connection, a wired connection, and a cellular band connection.

When there is one millimeter wave base station and there are two radio remote units, the millimeter wave base station may be connected to the two radio remote units, and the connection manner is any one of the following: a millimeter wave connection, a wired connection, and a cellular band connection.

When there are two millimeter wave base stations and there are two radio remote units, one millimeter wave base station may be connected to one radio remote unit in any manner of the following: a millimeter wave connection, a wired connection, and a cellular band connection; the other millimeter wave base station is connected to the other radio remote unit in any manner of the following: a millimeter wave connection, a wired connection, and a cellular band connection.

In the foregoing embodiment, only several possible implementation manners are exemplarily listed. For another possible implementation manner, details are not described herein again in this embodiment. FIG. 6 exemplarily shows only one possible architecture, and for another possible architecture, details are not described herein again in this embodiment. FIG. 6 shows three millimeter wave base stations, which are respectively an eNB1, an eNB2, and an eNB3. The eNB1 is connected to the RRU1 by using a millimeter wave, the eNB1 is connected to UE1 by using a millimeter wave, and the eNB1 is connected to UE2 by using a cellular band; the eNB2 is connected to the RRU2 in a wired manner, and the eNB2 is connected to the UE2 by using a cellular band; the eNB3 is connected to the RRU3 by using a cellular band, and the eNB3 is connected to UE3 by using a millimeter wave.

Optionally, when there are at least two millimeter wave base stations, a connection manner between the millimeter wave base stations includes at least one of the following: a millimeter wave connection, a wired connection, and a cellular band connection.

In the coordinated multipoint transmission technology, there is a connection between the eNB1, the eNB2, and the eNB3. FIG. 6 shows a possible implementation manner, and for another possible implementation manner, details are not described herein again in this embodiment. As shown in FIG. 6, the eNB1 is connected to the eNB2 by using a millimeter wave, and the eNB2 is connected to the eNB3 by using a cellular band.

According to the millimeter wave communications architecture provided in this embodiment, hybrid networking with various connection technologies is implemented, so that each communications device may be compatible with various versions of communications technologies.

Figure 7:
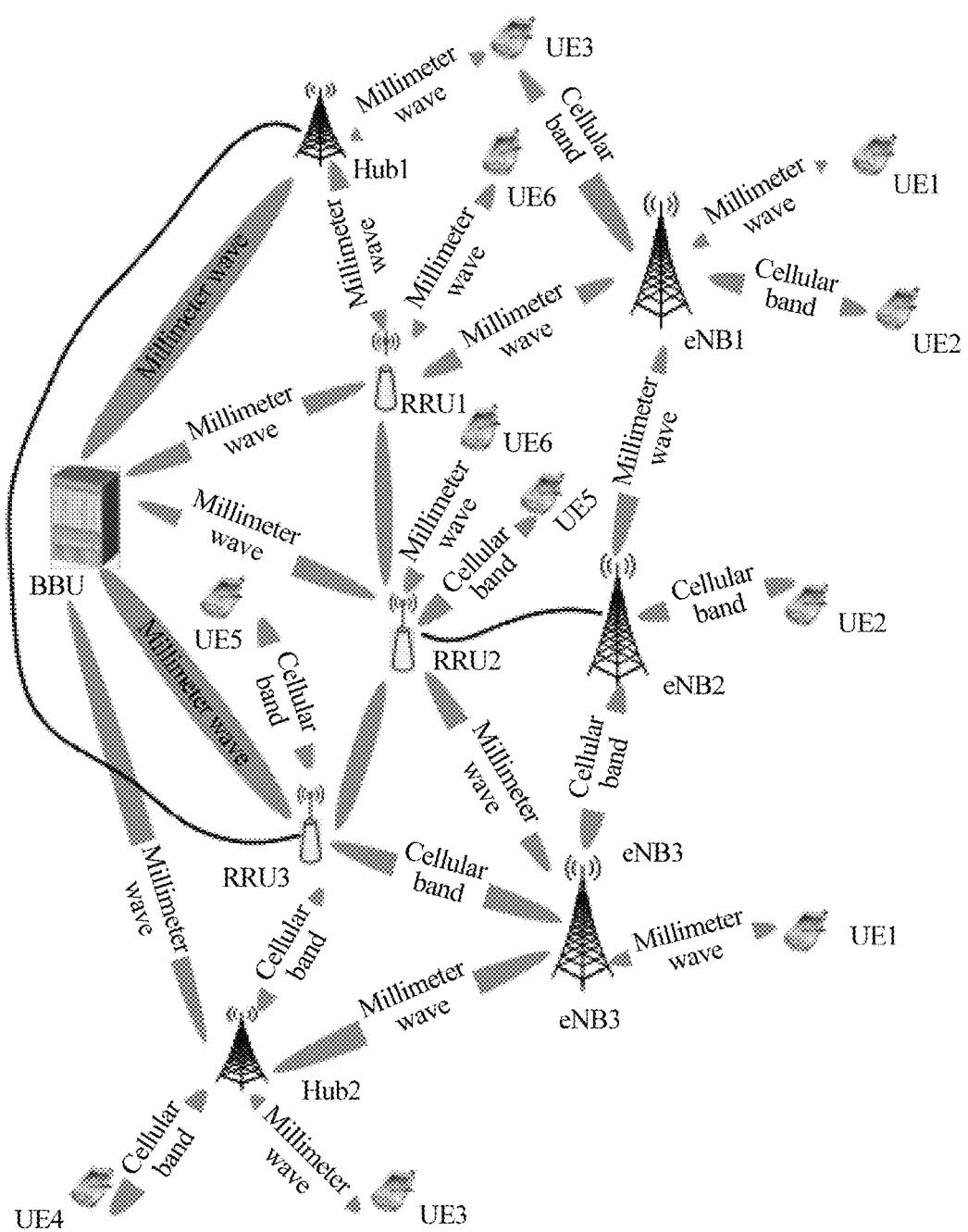
FIG. 7 is a schematic structural diagram of a millimeter wave communications architecture according to a third embodiment the present invention.

FIG. 7 is a schematic structural diagram of a millimeter wave communications architecture according to of a third embodiment the present invention. This embodiment is implemented based on the embodiment in FIG. 6. The millimeter wave communications architecture further includes at least one radio access point hub.

Each radio access point hub is connected to the baseband processing unit by using a millimeter wave.

The at least one radio access point hub and the at least one radio remote unit form a second networking structure.

A connection manner between any radio access point hub in the at least one radio access point hub and the at least one radio remote unit includes at least one of the following: a millimeter wave connection, a wired connection, and a cellular band connection.

In a specific implementation process, when there is one radio access point hub and there is one radio remote unit, a connection between the radio access point hub and the video remote unit may be any one of the following: a millimeter wave connection, a wired connection, and a cellular band connection.

When there is one radio access point hub and there are two radio remote units, the radio access point hub may be connected to the two radio remote units, and the connection manner is any one of the following: a millimeter wave connection, a wired connection, and a cellular band connection.

When there are two radio access point hubs and there are two radio remote units, one radio access point hub may be connected to one radio remote unit in any manner of the following: a millimeter wave connection, a wired connection, and a cellular band connection; the other radio access point hub is connected to the other radio remote unit in any manner of the following: a millimeter wave connection, a wired connection, and a cellular band connection.

In the foregoing embodiment, only several possible implementation manners are exemplarily listed. For another possible implementation manner, details are not described herein again in this embodiment. FIG. 7 exemplarily shows only one possible architecture, and for another possible architecture, details are not described herein again in this embodiment. FIG. 7 shows two radio access point hubs, a Hub1 and a Hub2. The Hub1 is connected to the BBU by using a millimeter wave, the Hub1 is connected to the RRU1 by using a millimeter wave, and the Hub1 is connected to the Hub2 in a wired manner; the Hub2 is connected to the BBU by using a millimeter wave, and the Hub2 is connected to the RRU3 by using a cellular band.

Optionally, the at least one radio access point hub and the at least one millimeter wave base station further form a third networking structure.

A connection manner between any radio access point hub in the at least one radio access point hub and the at least one millimeter wave base station includes at least one of the following: a millimeter wave connection, a wired connection, and a cellular band connection.

In a specific implementation process, when there is one millimeter wave base station and there is one radio access point hub, a connection between the millimeter wave base station and the radio access point hub may be any one of the following: a millimeter wave connection, a wired connection, and a cellular band connection.

When there is one millimeter wave base station and there are two radio access point hubs, the millimeter wave base station may be connected to the two radio access point hubs, and the connection manner is any one of the following: a millimeter wave connection, a wired connection, and a cellular band connection.

When there is one radio access point hub and there are two millimeter wave base stations, the radio access point hub may be connected to the two millimeter wave base stations, and the connection manner is any one of the following: a millimeter wave connection, a wired connection, and a cellular band connection.

When there are two millimeter wave base stations and there are two radio access point hubs, one millimeter wave base station may be connected to one radio access point hub in any manner of the following: a millimeter wave connection, a wired connection, and a cellular band connection; the other millimeter wave base station is connected to the other radio access point hub in any manner of the following: a millimeter wave connection, a wired connection, and a cellular band connection.

In the foregoing embodiment, only several possible implementation manners are exemplarily listed. For another possible implementation manner, details are not described herein again in this embodiment. FIG. 7 exemplarily shows only one possible architecture, and for another possible architecture, details are not described herein again in this embodiment. In FIG. 7, the Hub1 is connected to the eNB1 by using a cellular band, and the Hub2 is connected to the eNB3 by using a millimeter wave.

According to the millimeter wave communications architecture provided in this embodiment, hybrid networking with various connection technologies is implemented, so that each communications device may be compatible with various versions of communications technologies.

Optionally, any radio access point hub is further connected to third user equipment by using a millimeter wave, and/or the radio access point hub is further connected to fourth user equipment by using a cellular band.

In a specific implementation process, FIG. 7 exemplarily shows only one possible architecture, and for another possible architecture, details are not described herein again in this embodiment. In FIG. 7, the Hub1 is connected to the UE3 by using a millimeter wave, the Hub2 is connected to the UE3 by using a millimeter wave, and the Hub2 is connected to UE4 by using a cellular band.

Optionally, each radio remote unit is further connected to fifth user equipment by using a millimeter wave, and/or each radio remote unit is further connected to sixth user equipment by using a cellular band.

In a specific implementation process, FIG. 7 exemplarily shows only one possible architecture, and for another possible architecture, details are not described herein again in this embodiment. In FIG. 7, the RRU1 is connected to UE6 by using a millimeter wave, the RRU2 is connected to UE5 by using a cellular band, the RRU2 is connected to the UE6 by using a millimeter wave, and the RRU3 is connected to the UE5 by using a cellular band.

According to the millimeter wave communications architecture provided in this embodiment, hybrid networking with various connection technologies is implemented, so that each communications device may be compatible with various versions of communications technologies.

In the foregoing embodiments, a baseband processing unit is connected to another communications device such as a radio remote unit by using a millimeter wave, so that a protocol stack of the baseband processing unit and the radio remote unit also changes. When the radio remote unit communicates with user equipment, the user equipment supports all protocols in a wireless protocol stack, the radio remote unit supports a physical layer protocol and a non-collaborative MAC layer protocol, and the non-collaborative MAC layer protocol is used to process data of local non-collaborative user equipment, the baseband processing unit supports a collaborative MAC layer protocol and another protocol in the wireless protocol stack, and the collaborative MAC layer protocol is used to process data of local collaborative user equipment, where the local collaborative user equipment is served by at least two radio remote units.

When the radio remote unit communicates with user equipment, the user equipment supports all the protocols in the wireless protocol stack, the baseband processing unit supports a collaborative MAC layer protocol and another protocol in the wireless protocol stack, the collaborative MAC layer protocol is used to process data of local collaborative user equipment, and the local collaborative user equipment is served by at least two radio remote units, the radio remote units support a physical layer protocol and a non-collaborative MAC layer protocol, and the non-collaborative MAC layer protocol is used to process data of local non-collaborative user equipment.

The following uses a specific embodiment to describe a related communication method in the present invention in detail.

Figure 8:
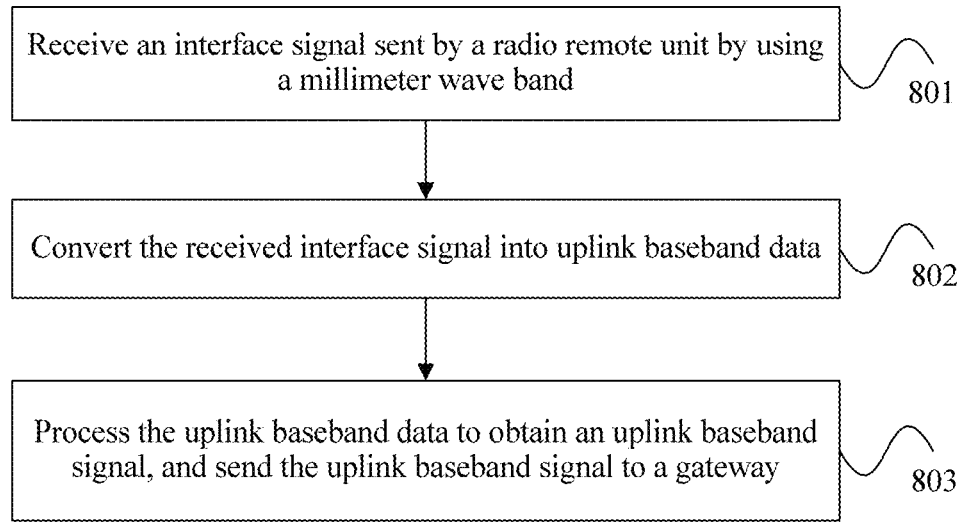
FIG. 8 is a schematic flowchart of a communication method according to a first embodiment the present invention.

FIG. 8 is a schematic flowchart of a first embodiment of a communication method according to the present invention. This embodiment is executed by the baseband processing unit in the foregoing embodiments. As shown in FIG. 8, the communication method includes:

Step 801: Receive an interface signal sent by a radio remote unit by using a millimeter wave band.

Step 802: Convert the received interface signal into uplink baseband data.

Step 803: Process the uplink baseband data to obtain an uplink baseband signal, and send the uplink baseband signal to a gateway.

Optionally, the method further includes:

receiving channel information sent by the radio remote unit by using the millimeter wave band;

performing beamforming on the interface signal according to the channel information to obtain an interface signal on which beamforming has been performed; and converting the interface signal on which beamforming has been performed into uplink baseband data.

Optionally, the method further includes:

processing the uplink baseband data to obtain an uplink baseband signal, and sending the uplink baseband signal to another baseband processing unit, so that the another baseband processing unit sends the uplink baseband signal to the gateway.

Optionally, when the interface signal sent by the radio remote unit by using the millimeter wave band is received, at least one of the following duplex modes is used:

time division duplex; or frequency division duplex; or code division duplex; or full duplex.

Optionally, when a signal sent by the radio remote unit by using the millimeter wave band is received, at least one of the following multiple access modes is used:

code division multiple access; or space division multiple access; or frequency division multiple access; or orthogonal frequency division multiple access; or single carrier frequency division multiple access.

The communication method shown in this embodiment may be executed by the foregoing baseband processing unit, and implementation principles and technical effects thereof are similar and are not described herein again in this embodiment.

Figure 9:
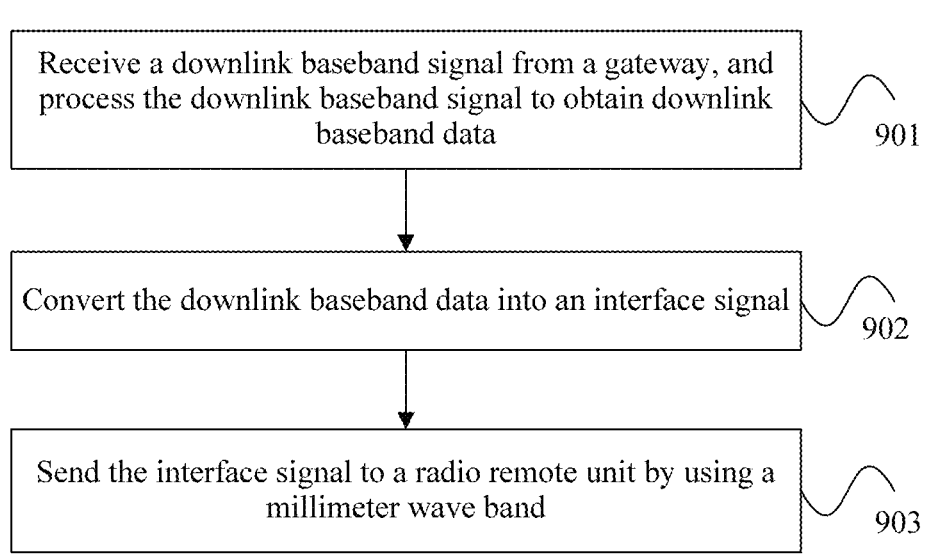
FIG. 9 is a schematic flowchart of a communication method according to a second embodiment the present invention.

FIG. 9 is a schematic flowchart of a second embodiment of a communication method according to the present invention. This embodiment is executed by the baseband processing unit in the foregoing embodiments. As shown in FIG. 9, the communication method includes:

Step 901: Receive a downlink baseband signal from a gateway, and process the downlink baseband signal to obtain downlink baseband data.

Step 902: Convert the downlink baseband data into an interface signal.

Step 903: Send the interface signal to a radio remote unit by using a millimeter wave band.

Optionally, the method further includes:

sending channel information to the radio remote unit by using the millimeter wave band, where the channel information is used by the radio remote unit to perform beamforming on the interface signal.

Optionally, the method further includes:

acquiring a downlink baseband signal from the gateway by using another baseband processing unit, and processing the downlink baseband signal to obtain downlink baseband data.

Optionally, when a signal is sent to the radio remote unit by using the millimeter wave band, at least one of the following duplex modes is used:

time division duplex; or frequency division duplex; or code division duplex; or full duplex.

Optionally, when a signal is sent to the radio remote unit by using the millimeter wave band, at least one of the following multiple access modes is used:

code division multiple access; or space division multiple access; or frequency division multiple access; or orthogonal frequency division multiple access; or single carrier frequency division multiple access.

The communication method shown in this embodiment may be executed by the foregoing baseband processing unit, and implementation principles and technical effects thereof are similar and are not described herein again in this embodiment.

Figure 10:
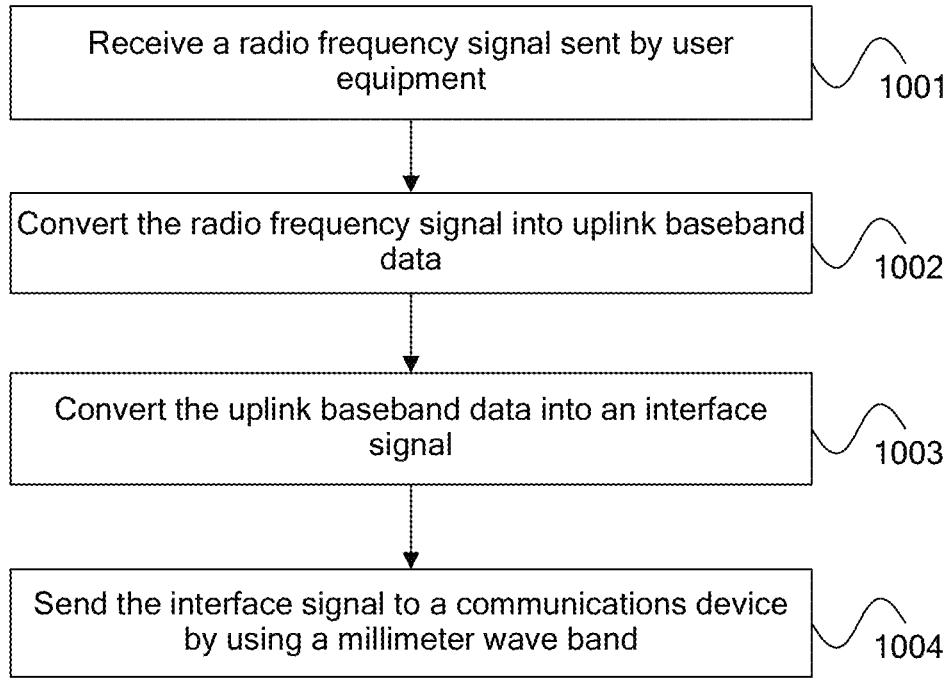
FIG. 10 is a schematic flowchart of a communication method according to a third embodiment the present invention.

FIG. 10 is a schematic flowchart of a third embodiment of a communication method according to the present invention. This embodiment is executed by the radio remote unit in the foregoing embodiments. As shown in FIG. 10, the communication method includes:

Step 1001: Receive a radio frequency signal sent by user equipment.

Step 1002: Convert the radio frequency signal into uplink baseband data.

Step 1003: Convert the uplink baseband data into an interface signal.

Step 1004: Send the interface signal to a communications device by using a millimeter wave band.

Optionally, the communications device includes:

a millimeter wave base station; or a radio access point hub; or another radio remote unit; or a baseband processing unit.

Optionally, the receiving a radio frequency signal sent by user equipment includes:

receiving, by using the millimeter wave band or a cellular band, the radio frequency signal sent by the user equipment.

The communication method shown in this embodiment may be executed by the foregoing radio remote unit, and implementation principles and technical effects thereof are similar and are not described herein again in this embodiment.

Figure 11:
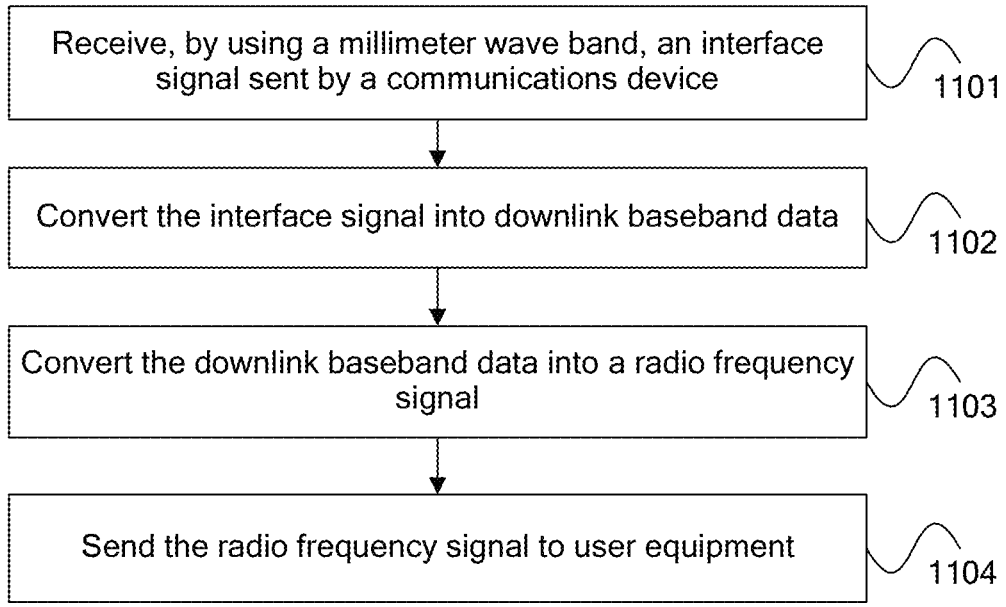
FIG. 11 is a schematic flowchart of a communication method according to a fourth embodiment the present invention.

FIG. 11 is a schematic flowchart of a fourth embodiment of a communication method according to the present invention. This embodiment is executed by the radio remote unit in the foregoing embodiments. As shown in FIG. 11, the communication method includes:

Step 1101: Receive, by using a millimeter wave band, an interface signal sent by a communications device.

Step 1102: Convert the interface signal into downlink baseband data.

Step 1103: Convert the downlink baseband data into a radio frequency signal.

Step 1104: Send the radio frequency signal to user equipment.

Optionally, the communications device includes a millimeter wave base station, or a radio access point hub, or another radio remote unit, or a baseband processing unit.

Optionally, the sending the radio frequency signal to user equipment includes:

sending the radio frequency signal to the user equipment by using the millimeter wave band or a cellular band.

The communication method shown in this embodiment may be executed by the foregoing radio remote unit, and implementation principles and technical effects thereof are similar and are not described herein again in this embodiment.

Figure 12:
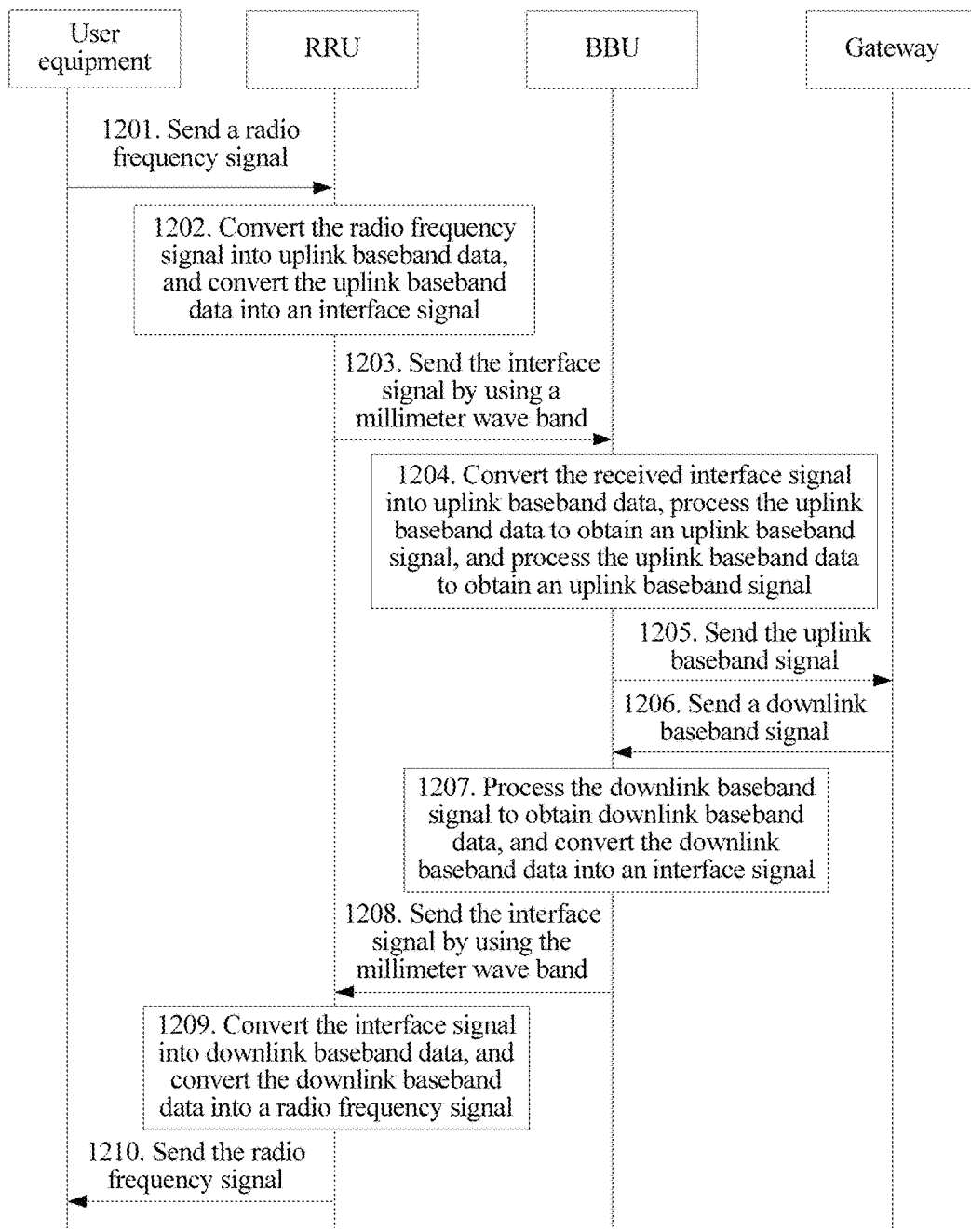
FIG. 12 is a schematic diagram of a signaling procedure of a communication method according to the present invention.

FIG. 12 is a schematic diagram of a signaling procedure of a communication method according to the present invention. In FIG. 12, a complete uplink and downlink communication process is described by using any embodiment. As shown in FIG. 12, the communication method includes:

1201. User equipment sends a radio frequency signal to an RRU.

1202. The RRU converts the radio frequency signal into uplink baseband data, and converts the uplink baseband data into an interface signal.

1203. The RRU sends the interface signal to a BBU by using a millimeter wave band.

1204. The BBU converts the received interface signal into uplink baseband data, and processes the uplink baseband data to obtain an uplink baseband signal.

1205. The BBU sends the uplink baseband signal to a gateway.

1206. The gateway sends a downlink baseband signal to the BBU.

1207. The BBU processes the downlink baseband signal to obtain downlink baseband data, and converts the downlink baseband data into an interface signal.

1208. The BBU sends the interface signal to the RRU by using the millimeter wave band.

1209. The RRU converts the interface signal into downlink baseband data, and converts the downlink baseband data into a radio frequency signal.

1210. The RRU sends the radio frequency signal to the user equipment.

Persons of ordinary skill in the art may understand that another embodiment is similar to this embodiment, and details are not described herein again.

Persons of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A baseband processing unit connected with a radio remote unit using a millimeter wave band in a radio access network (RAN) is implemented in a C-RAN architecture based on centralized processing, collaborative radio, and a real-time cloud infrastructure, the baseband processing unit comprising:

a millimeter wave band transceiver, configured to:
receive an interface signal and channel information from the radio remote unit using the millimeter wave band, and
perform beamforming on the interface signal to obtain beamformed interface signal according to the channel information;

an interface signal processor, configured to convert the beamformed interface signal into uplink baseband data; and a baseband data processor, configured to process the uplink baseband data to obtain an uplink baseband signal, and send the uplink baseband signal to a gateway; and wherein the baseband processing unit supports a collaborative Media Access Control (MAC) layer protocol, and the collaborative MAC layer protocol is used to process data of local collaborative user equipment, wherein the local collaborative user equipment is served by at least two radio remote units.

2. The baseband processing unit according to claim 1, wherein the baseband data processor is further configured to:
process the uplink baseband data to obtain an uplink baseband signal, and send the uplink baseband signal to another baseband processing unit, so that the another baseband processing unit sends the uplink baseband signal to the gateway.

3. The baseband processing unit according to claim 1, wherein when the millimeter wave band transceiver receives the interface signal from the radio remote unit by using the millimeter wave band, at least one of duplex modes is used, the duplex modes comprising:
time division duplex,
frequency division duplex,
code division duplex, or
full duplex.

4. The baseband processing unit according to claim 1, wherein when the millimeter wave band transceiver receives the interface signal, at least one of multiple access modes is used, the multiple access modes comprising:
code division multiple access,
space division multiple access,
frequency division multiple access,
orthogonal frequency division multiple access, or
single carrier frequency division multiple access.

5. The baseband processing unit according to claim 1, wherein:
the radio remote unit is configured to communicate with user equipment;
the radio remote unit supports a physical layer protocol and a non-collaborative Media Access Control (MAC) layer protocol; and the non-collaborative MAC layer protocol is used to process data of local non-collaborative user equipment.

6. A communication method of a baseband processing unit connected with a radio remote unit using a millimeter wave band in a radio access network (RAN) is implemented in a C-RAN architecture based on centralized processing, collaborative radio, and a real-time cloud infrastructure, the baseband processing unit, the communication method comprising:
  receiving an interface signal and channel information from the radio remote unit using the millimeter wave band;
  performing beamforming on the interface signal to obtain beamformed interface signal according to the channel information; and
  converting the beamformed interface signal into uplink baseband data;
  processing the uplink baseband data to obtain an uplink baseband signal; and
  sending the uplink baseband signal to a gateway; and
  wherein the baseband processing unit supports a collaborative Media Access Control (MAC) layer protocol, and the collaborative MAC layer protocol is used to process data of local collaborative user equipment, wherein the local collaborative user equipment is served by at least two radio remote units.

7. The communication method according to claim 6, further comprising:
  processing the uplink baseband data to obtain an uplink baseband signal, and sending the uplink baseband signal to another baseband processing unit, so that the another baseband processing unit sends the uplink baseband signal to the gateway.

8. The communication method according to claim 6, wherein when the interface signal is received, at least one of duplex modes is used, the duplex modes comprising:
  time division duplex,
  frequency division duplex,
  code division duplex, or
  full duplex.

9. The communication method according to claim 6, wherein when the interface signal is received, at least one of multiple access modes is used, the multiple access modes comprising:
  code division multiple access,
  space division multiple access,
  frequency division multiple access,
  orthogonal frequency division multiple access, or
  single carrier frequency division multiple access.

10. The communication method according to claim 6, wherein:
  the radio remote unit is configured to communicate with user equipment;
  the radio remote unit supports a physical layer protocol and a non-collaborative Media Access Control (MAC) layer protocol; and
  the non-collaborative MAC layer protocol is used to process data of local non-collaborative user equipment.

* * * * *